United States Patent [19]

Vali et al.

[11] 4,159,178
[45] Jun. 26, 1979

[54] STIMULATED BRILLOUIN SCATTERING RING LASER GYROSCOPE

[75] Inventors: Victor Vali; Richard W. Shorthill, both of Salt Lake City, Utah

[73] Assignee: University of Utah Research Institute, Salt Lake City, Utah

[21] Appl. No.: 744,654

[22] Filed: Nov. 24, 1976

[51] Int. Cl.² ............................ G01B 9/02; G01P 9/00
[52] U.S. Cl. .................................................. 356/350
[58] Field of Search ................................... 356/106 LR

[56] References Cited

U.S. PATENT DOCUMENTS

| | | | |
|---|---|---|---|
| 3,617,927 | 11/1971 | Pohl | 331/94.5 Q |
| 3,714,607 | 1/1973 | Cutler | 356/106 LR |
| 4,013,365 | 3/1977 | Vali et al. | 356/106 LR |

Primary Examiner—Vincent P. McGraw

[57] ABSTRACT

A stimulated Brillouin scattering (SBS) ring laser gyroscope. The SBS laser gyroscope is fabricated from a single-mode optical fiber waveguide and is optically coupled to a laser to accommodate being pumped in two directions by laser radiation having sufficient energy to induce stimulated Brillouin scattering radiation (SBS). The apparatus includes means for extracting a portion of each of the SBS radiation from the single-mode optical fiber waveguide and superimposing the extracted portions to permit detection of a beat frequency therebetween. The beat frequency detected is indicative of the rate of angular rotation of the area circumscribed by the single-mode optical fiber waveguide. Means are provided to accommodate a significant reduction in the required laser pumping power.

12 Claims, 4 Drawing Figures

STIMULATED BRILLOUIN SCATTERING RING LASER GYROSCOPE

BACKGROUND

1. Field of the Invention

This invention relates to laser gyroscopes and, more particularly, to a stimulated Brillouin scattering ring laser gyroscope utilizing a loop of single-mode optical fiber waveguide as the laser cavity. Stimulated Brillouin scattering is induced and utilized as the counter-directionally travelling radiation between which the beat frequency is detected and measured as a function of the angular rate of rotation of the ring laser gyroscope.

2. The Prior Art

Conventional laser gyroscopes utilize the properties of the optical oscillator (laser) and the theory of relativity to produce an integrating rate gyroscope. The laser gyroscope operates on a well-known principle that rotation of an operating ring laser (optical oscillator) about its axis causes the laser cavity to experience an apparent change in length for each direction. This apparent change in length creates a frequency shift in the laser oscillator in each direction. As between two counter-directionally travelling laser oscillations, portions of each may be superimposed so that the frequency shift will be manifested as a beat frequency. This beat frequency is proportional to the rate of angular rotation of the gyroscope and is, therefore, meansurable to provide an indication of the rate of angular rotation of the area circumscribed by the ring laser oscillator or ring laser gyroscope.

The relationship between the observed beat frequency, $\Delta f$, and the rotation rate, $\omega$, is:

$$\Delta f = 4A\omega/\lambda L \quad (1)$$

where $\lambda$ is the wavelength of the laser radiation, A is the area enclosed or circumscribed by the ring laser and L is the length of the oscillator cavity.

The fundamental condition is that the laser wavelength, $\lambda$, in each direction, multiplied by an integer, N, must be equal to the optical path length for the oscillator. This integer, N, is typically in the range of $10^5$ to $10^7$ (or larger, on certain geophysical applications).

$$L = N\lambda \quad (2)$$

Accordingly, a change in length, $\Delta L$, will, correspondingly, cause a wavelength change, $\Delta\lambda$, as follows:

$$\Delta\lambda = \Delta L/N \quad (3)$$

The corresponding frequency change, $\Delta f$, is given as $$\Delta f/f = \Delta L/L \quad (4)$$

Therefore, given small length differences, $\Delta L$, and reasonable cavity lengths, L, the operating frequency for a conventional ring laser gyroscope should be as high as possible.

The frequency at which each oscillator operates is determined by the optical path length encountered by the laser radiation in the cavity in which it travels. While apparent path length differences in the conventional ring laser gyroscope (wherein two oscillator paths are contained in essentially the same laser cavity and which length differences are caused by rotation of the single cavity) create a shift in the frequencies in each of the two oscillators, whereas physical changes in cavity length caused by temperature changes, vibration, etc., do not cause frequency differences.

The relationship between inertial input rates, $\omega$, and apparent length change, $\Delta L$, has been given as $$\Delta L = 4A\omega/c \quad (5)$$

The relationship between $\Delta f$ and $\omega$, in terms of the gyroscope size and length is determined by substituting Equation 4 into Equation 5, giving $$f = 4A\omega/\lambda L \quad (6)$$

where $c = \lambda f$.

From the foregoing relationship, (Equation 6), it is readily observable that at extremely small angular rotation rates, $\omega$, the beat frequency, $\Delta f$, for that particular rotation rate, $\omega$, will also be relatively small.

Thus, the conventional laser gyroscope measures path differences of less than $10^{-6}$ Angstroms, and frequency changes to less than 0.1 Hertz, hereinafter, Hz, (a precision of better than one part in $10^{15}$) in order to read rotation rates of less than 0.1 degrees per hour.

Unfortunately, there is a tendency for a solid state ring laser gyroscope to oscillate in one direction only. This problem is partially alleviated by using a gaseous gain section in the ring laser gyroscope. The gaseous gain section has an inhomogeneous line broadening and can, therefore, oscillate in both directions simultaneously. The electrical discharge in the gaseous gain section, however, introduces turbulence and gas flow with an associated effect referred to as the Fizeau effect. The Fizeau effect is the tendency for the gaseous flow to drag the laser radiation in the direction of the gaseous flow. This introduces certain errors in the accuracy of the ring laser gyroscope.

Additionally, the gas flow in the discharge is almost always turbulent so that bias created by the generally unidirectional gas flow is random thereby creating an error which is difficult to eliminate. One technique to reduce this error has been to produce electrical discharges in two equal-length discharge gaps with equal but oppositely directed electrical currents.

One such ring laser gyroscope is disclosed in U.S. Pat. No. 3,484,169 but has certain inherent limitations to its accuracy by the nature of its construction and components. For example, it uses a gaseous gain section thereby overcoming the serious problem of unidirectional oscillation. However, the electrical discharge in the gaseous medium creates the aforementioned unidirectional gas flow with the associated Fizeau effect so that the gaseous laser cavity is optically longer in one direction than the other even when the ring laser is not rotated.

Additionally, some other limitations of the conventional ring laser gyroscope are phenomena known as "mode pulling" and "lock-in". These phenomena are experienced when the frequency difference between the two oscillators becomes small (less than about 500 Hz). The band width of each oscillator is not sharply defined so that an overlapping of frequencies occurs causing an optical coupling between the two oscillators.

Optical coupling between the two oscillators at low rates of angular rotation is also known to result from scattering caused by imperfections in the single-mode optical fiber waveguide. These imperfections arise from minute flaws such as compositional fluctuations and phase separations in the molten material from which the single-mode optical fiber waveguide is drawn during manufacture. These flaws manifest themselves as elongated imperfections generally parallel to the axis of the single-mode optical fiber waveguide and cause scattering of the oscillator radiation to thereby reduce the delineation of the band width of the optical oscillator. This phenomenon is known in the art as Rayleigh scattering which appears in both the cladding (where it can be absorbed) and in the core as a backward-scattered guided wave.

Another scattering phenomenon which has been observed in optical fiber waveguides is known as Mie scattering. Mie scattering is predominantly a forward scatter and is caused by inhomogeneities comparable in size to the wavelength.

The foregoing scattering and optical coupling between two oscillators operating in essentially the same physical cavity pulls the frequencies closer together (mode pulling) and ultimately locks them together (lock-in) into one frequency, thereby eliminating any beat frequency (dead band) at low frequency differences. Accordingly, when the output of the ring laser oscillator is observed as a function of the rotation rate it is readily seen that, as the rotation rate decreases, the beat frequency rapidly falls to zero before the rotation rate falls to zero as a result of the foregoing phenomena of "lock-in".

Several techniques have been used to reduce the width of this "dead band" and increase the accuracy of the conventional ring laser gyroscope. These techniques include: (1) biasing the ring laser gyroscope by physically increasing the rate of rotation of the laser gyroscope (with a sinusoidally varying angular velocity, for example) and then subtracting out the biasing; or (2) introducing an optical element into the oscillator cavity, the optical element having an index of refraction dependent upon the direction of the laser radiation passing through the element. One of these latter phenomena is known as the Faraday Effect. However, these techniques introduce errors into the system and are also temperature dependent thereby greatly restricting the accuracy and the application capability of the conventional single cavity ring laser gyroscope.

A useful discussion of some of the basic theories involved in the laser gyroscope may be found in IEEE SPECTRUM "The Laser Gyro", Joseph Killpatrick, October, pages 44–55 (1967).

In view of the foregoing, what is needed is an improved laser gyroscope in which the tendency to unidirectionally oscillate and the mode pulling and lock-in phenomena experienced in conventional laser gyroscopes at low rates of angular rotation are significantly reduced. It would also be an improvement in the art to provide a stimulated Brillouin scattering radiation ring laser gyroscope. Another improvement would be to provide a ring laser gyroscope and method whereby the pumping power is significantly reduced. Such an improvement is disclosed in the present invention.

BRIEF SUMMARY AND OBJECTS OF THE INVENTION

The present invention relates to an improved SBS ring laser gyroscope apparatus and method wherein a single-mode optical fiber waveguide is pumped in two directions to induce stimulated Brillouin scattering radiation counter-directionally in the single-mode optical fiber waveguide. The stimulated Brillouin scattering is downshifted in frequency from the pumping radiation by the travelling acoustic wave created when the single-mode optical fiber waveguide is pumped. Unidirectional oscillation and the mode pulling and lock-in phenomena as between the two, downshifted, stimulated Brillouin scattering radiation modes is significantly reduced allowing measurement of very low rates of angular rotation.

It is, therefore, a primary object of this invention to provide improvements in ring laser gyroscopes and, more particularly, in stimulated Brillouin scattering ring laser gyroscopes.

Another object of this invention is to provide a method for reducing mode-pulling and lock-in errors for ring laser gyroscopes at low rates of angular rotation.

Another object of this invention is to reduce the interaction between oppositely travelling stimulated Brillouin scattering waves.

Another object of this invention is to reduce the minimum pumping radiation power required to develop suitable stimulated Brillouin scattering radiation.

Another object of this invention is to reduce the possibility of unidirectional oscillation in a ring laser gyroscope by inducing counter-directional stimulated Brillouin scattering radiation as determined by the directions of the counter-directional pumping radiation.

These and other objects and features of the present invention will become more fully apparent from the following description and appended claims taken in conjunction with the accompanying drawing.

DETAILED DESCRIPTION OF THE PREFERRED EMBODIMENTS

Figure 1:
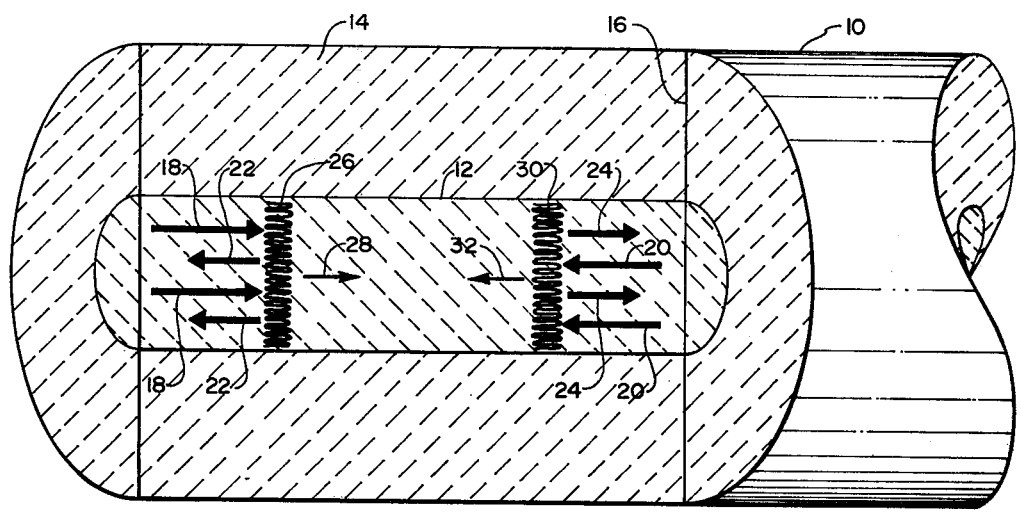
FIG. 1 is an enlarged schematic illustration of a fragment of a single-mode optical fiber waveguide being pumped to produce stimulated Brillouin scattering radiation, portions being broken away to reveal internal features.

The invention is best understood by reference to the Figures wherein like parts are designated with like numerals throughout.

General Discussion

Many of the difficulties encountered with various optical systems and gas laser apparatus can be readily overcome by using a single-mode optical fiber waveguide as the laser cavity. Single-mode optical fiber waveguides are of recent development and are commercially available in even extended lengths.

A single-mode optical fiber waveguide is defined as one wherein only the lowest order mode can exist. This is done by making the refractive index of the core ($n_1$), slightly greater than the refractive index of the cladding ($n_2$). Where this difference is small, one can make the core radius (a) relatively large, several wavelengths in practice ($\lambda$, the free space wavelength), and still have single-mode operation. The relationship is written as:

$$\frac{2\pi a}{\lambda (n_1^2 - n_2^2)^{\frac{1}{2}}} < 2.4 \qquad (7)$$

This is believed to be of some practical importance in view of the small size of a wavelength for manufacturing the fiber and in achieving low dispersion. Single-mode optical fiber waveguides are particularly well suited to transmit laser radiation which will, advantageously, be in the form of a single mode (the lowest order mode).

Recent work with single-mode optical fiber waveguides has revealed that the single-mode optical fiber waveguide behaves in a nonlinear fashion at relatively moderate optical or photon pump power levels. The laser pumping action was found to cause an acoustic or compressional wave in the single-mode optical fiber waveguide, the acoustic wave travelling in the same direction as the pumping radiation. The travelling acoustic wave changes the index of refraction of the single-mode optical fiber waveguide resulting in a frequency shift in the backscattered radiation passing through the acoustic wave. This phenomena was originally discussed by Brillouin and, therefore, bears his name (L. Brillouin, Ann. Phys. (Paris) 17, 88 (1922)).

In one particular experiment, continuous wave stimulated Brillouin scattering (SBS) has been observed in a glass fiber using a xenon-laser pump at 5355 Angstroms with power levels of 250 microwatts (mw). This particular Brillouin laser was oscillating in one direction only thereby acting as a unidirectional travelling wave oscillator.

Importantly, the backscattered radiation or SBS has been found to be coherent when the pump power exceeds about 250 mw. Recent experiments have been conducted with a single-mode optical fiber waveguide having a core diameter of 2.4 micrometers serving as the gain medium. The fiber was pumped with a single-mode laser and was found to down shift the SBS radiation 34 giga herz (gh) from the laser frequency of 5145 Angstrom units.

In general, the interaction between photons ($\hbar\omega_o$) and phonons ($\hbar\omega+$) has to satisfy energy conservation:

$$\hbar\omega_o \hbar\omega_a = \hbar\omega_+ \qquad (8)$$
$$\hbar\omega_o \hbar\omega_a = \hbar\omega_-$$

and momentum conservation:

$$\hbar\vec{K}_o + \hbar\vec{K}_a = \hbar\vec{K}_+ \qquad (9)$$
$$\hbar\vec{K}_o + \hbar\vec{K}_a = \hbar\vec{K}_-$$

where $\hbar = h/2\pi$ (Plancks constant), $W_o$ is the frequency of the incident (pump) electromagnetic wave, $W_a$ is the frequency of the acoustic wave, $W_-$ is the frequency of the down-converted Brillouin scattered wave, $\vec{K}$'s, are the corresponding wave vectors ($\vec{K} = 2\pi/\lambda$). It is to be noted that the wave vector for the incident (pump) beam $\vec{K}_o$ or $\vec{K}_\pm$, the Brillouin scattered wave is of the same order of magnitude as $\vec{K}_a$. The wavelengths of both the electromagnetic and the acoustic waves are comparable. Also, $\vec{K}_o \approx \vec{K}_\pm$ because the relative frequency shift between the pump radiation and SBS radiation is small.

The conservation laws (8) and (9) together with the requirement that $\vec{K}_o \approx \vec{K}_\pm$ say that the SBS radiation in a fiber can take place *only* in the backward direction with respect to the pump radiation. The vector diagram is shown below $$\begin{array}{c} \overleftarrow{K_-} \quad \overrightarrow{K_o} \\ \overrightarrow{K_a} \\ \text{i.e., } \overrightarrow{K_o} = \overrightarrow{K_a} + \overrightarrow{K_-} \end{array} \qquad (10)$$

Here one photon ($\vec{K}_o$) produces a phonon ($\vec{K}_a$) and a scattered, downconverted photon ($\vec{K}_-$). The phonon has to travel in the direction of the initial (pump radiation) photon. Upconversion can take place if initially both a photon and a phonon (originating from the additional pump radiation going in the opposite direction) are present and travelling in opposite directions, in this case $$\begin{array}{c} \overleftarrow{K} \quad \overrightarrow{K_o} \\ \overleftarrow{K_a} \\ \text{i.e., } \overrightarrow{K_o} + \overrightarrow{K_a} = \overrightarrow{K_+} \end{array} \qquad (11)$$

In both cases $$|\vec{K}_a| \approx 2|\vec{K}_o| \qquad (12)$$

The SBS radiation can also be considered as a special case of Bragg diffraction. In this case the "diffraction grating" is the accoustic wave produced by the incident pump radiation (subject to energy and momentum conservation condition, equation (8) and (9)).

The "diffraction grating" is the moving acoustic pressure wave travelling through the solid with phase velocity $V_a$. It is noted that the pressure changes in the solid change the dielectric constant; therefore, the reflectivity inside the solid varies sinusoidally. If the acoustic wave is allowed to move oppositely to the pump wave (as is the case when a fiber is pumped in both directions) the scattered Brillouin radiation is upconverted (anti-Stokes radiation). When the acoustic radiation is travelling in the same direction as the pump radiation (as is the case when the fiber is pumped only in one direction) the scattered Brillouin radiation is only downconverted (Stokes radiation).

In an optical fiber waveguide only the forward and backward travelling waves need to be considered, since the radiation travelling in any other direction leaves the fiber core. Therefore, the SBS radiation is always travelling in the opposite direction with respect to the pump radiation and is either upconverted or downconverted by a frequency generally equal to the acoustic wave frequency in the single-mode optical fiber waveguide. In case of SBS radiation, the energy in the scattered wave is orders of magnitude greater than in the incoherent scattering process.

The SBS radiation of interest herein in the single-mode optical fiber waveguide always travels in the opposite direction with respect to the pump radiation. When the single-mode optical fiber waveguide is pumped in both directions the SBS radiation can be either upconverted or downconverted. Therefore, the following diagram is instructive for deciding the direction of motion and the frequency shift of the SBS wave.

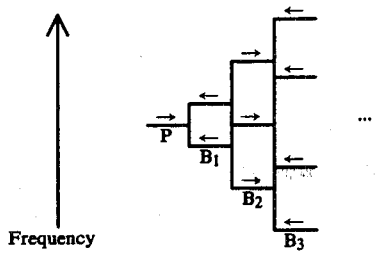

(13)

Frequency

Here P is the pump radiation and $B_1$ is the first order SBS radiation, $B_2$ is the second order SBS radiation (here $B_1$ is considered as the pump radiation for $B_2$) etc. It is seen from the diagram that, for example, if the first order, downshifted SBS radiation ($B_1$) travels to the left, all the other orders at the same frequency will also travel to the left. Therefore, no SBS radiation from the left moving first order (the SBS radiation since only the first order will be pumped strongly enough to produce SBS) will ever be fed into a right moving radiation at the same frequency. If the fiber is pumped in the opposite direction all the arrows on the diagram must be reversed. It is therefore clear that there is no interaction between the right and left travelling (once downshifted), SBS waves.

The remaining interactions between the right and left travelling SBS waves in a fiber loop are the Rayleigh scattering and the scattering due to nonuniformity of the fiber core. A semiquantitative comparison of a mirrored ring laser and a fiber ring laser as far as these backscatters are concerned can be made as follows. Assuming that the losses on the mirror surface are mostly scattering losses, the rectangular mirrored ring laser would lose a fraction, A, per round trip in the system. That is $$A = 1 - \alpha^N \quad (14)$$

where $\alpha$ is the reflection coefficient of the mirrors and N is the number of mirrors. Using the best available mirrors $\alpha^N \approx 0.999^4$, and A = 0.004 or 0.4%. In a fiber the losses are assumed to be entirely due to Rayleigh scattering. (This is a very conservative assumption because absorption losses do not contribute to the backscatter). Therefore, $$I/I_o = 10^{-\alpha x} \quad (15)$$

where $I/I_o$ is the intensity ratio of the radiation that is transmitted through a fiber (of length x) to the initial intensity and $\alpha$ is the attenuation coefficient (dB/km). For a very large fiber ring laser x = 10 meters. For $\alpha = 2$ dB/km one obtains $$I/I_o = 10^{-0.2(0.01)} = 0.995 \quad (16)$$

a loss of 0.5%. If the fiber ring laser is made smaller the fiber backscatter losses are smaller. It is seen that even for grossely overestimating the backscatter in a fiber the 2 dB/km fiber is comparable with the best mirrored system available today.

The second part of this invention consists of minimizing the required pump power. At present about 250 milliwatts, mw, are required. This can be reduced by several orders of magnitude. The minimum pump power, P, is given by $$P \geq \frac{2\epsilon Bc}{\left(\rho \frac{d\epsilon}{d\rho}\right)^2 K_a K_-\left[\frac{1}{L_a} + \frac{1}{L_-}\right]} \quad (17)$$

where $\epsilon$ is the dielectric constant, B is the bulk modulus, c is the velocity of light, $\rho$ is the density of the material (fiber), $k_a$ and $k_-$ are the propagation vectors for the acoustic and downshifted SBS waves, respectively, and $L_a$ and $L_-$ are the decay lengths (or the inverse absorption coefficients) of the acoustic and SBS waves, respectively. In a fiber $L_-$ is of the order of 10's to 1000's of meters. The $L_a$, however, is of the order of $10^{-2}$ cm. Therefore the minimum power to initiate the SBS waves is determined almost entirely by the acoustic absorption. It is well known that the ultrasonic absorption coefficient is strongly temperature dependent, and can be decreased several orders of magnitude by lowering the temperature. For materials like $Al_2O_3$ the attenuation coefficient for a 1 GHZ acoustic wave changes from about 1 dB/cm at 90° K. to 0.004 dB/cm at 35° K.

From the foregoing Equation 17 it is seen that an increase of attenuation length of one order of magnitude decreases the minimum power by two orders. This would reduce the pump power requirement from 250 milliwatts to 2.5 milliwatts. It is, therefore, possible to reduce the interaction between oppositely travelling SBS waves to a small value as well as to reduce the minimum pump power to a small value by reducing the attenuation coefficient by lowering the temperature of at least a portion of the single-mode optical fiber waveguide.

Referring now to FIG. 1, a fragmentary portion of a single-mode optical fiber waveguide 10 is shown greatly enlarged for ease of illustration and discussion. The single-mode optical fiber waveguide 10 includes a core 12 surrounded by a cladding 14 both of which are cut away at 16 to more clearly demonstrate schematically what is currently believed to occur when stimulated Brillouin scattering (SBS) radiation is induced in the core 12. A SBS ring laser gyroscope requires that SBS radiation be induced counter-directionally through the single-mode optical fiber waveguide 10. Accordingly, the single-mode optical fiber waveguide 10 and, more particularly, core 12 therein is pumped counter-directionally with pumping radiation shown herein schematically as pumping radiation arrows 18 and 20. For ease of continued illustration the inducement of SBS radiation will be discussed for one direction only, it being particularly understood that the same phenomena occurs for the oppositely travelling SBS radiation.

Core 12 is pumped with pumping radiation 18 which has sufficient energy to induce SBS radiation in the reverse direction as shown schematically at arrows 22. Pumping radiation 18 develops an acoustic wave 26 having a direction of travel as indicated by arrow 28 which is the same direction as pumping radiation 18. Importantly, as set forth hereinbefore, the travelling acoustic wave 26 alters the dielectric constant of core 12 resulting in a downshifting of the frequency of SBS radiation 22. Although shown herein schematically as a pulse, pumping radiation 18 is a continuous wave pumping radiation and the acoustic wave 26 established in core 12 is also a continuous wave. Accordingly, the SBS radiation 22 is also a continuous wave.

Corresponding phenomena is also observed by the action of the counter-directionally travelling pumping laser radiation 20, the induced SBS radiation 24 and acoustic wave 30 travelling in direction 32. Importantly, as between the two sets of counter-directional SBS radiation, there is minimal interference between the two thereby enhancing the utility of the described and claimed SBS ring laser gyroscope.

Figure 2:
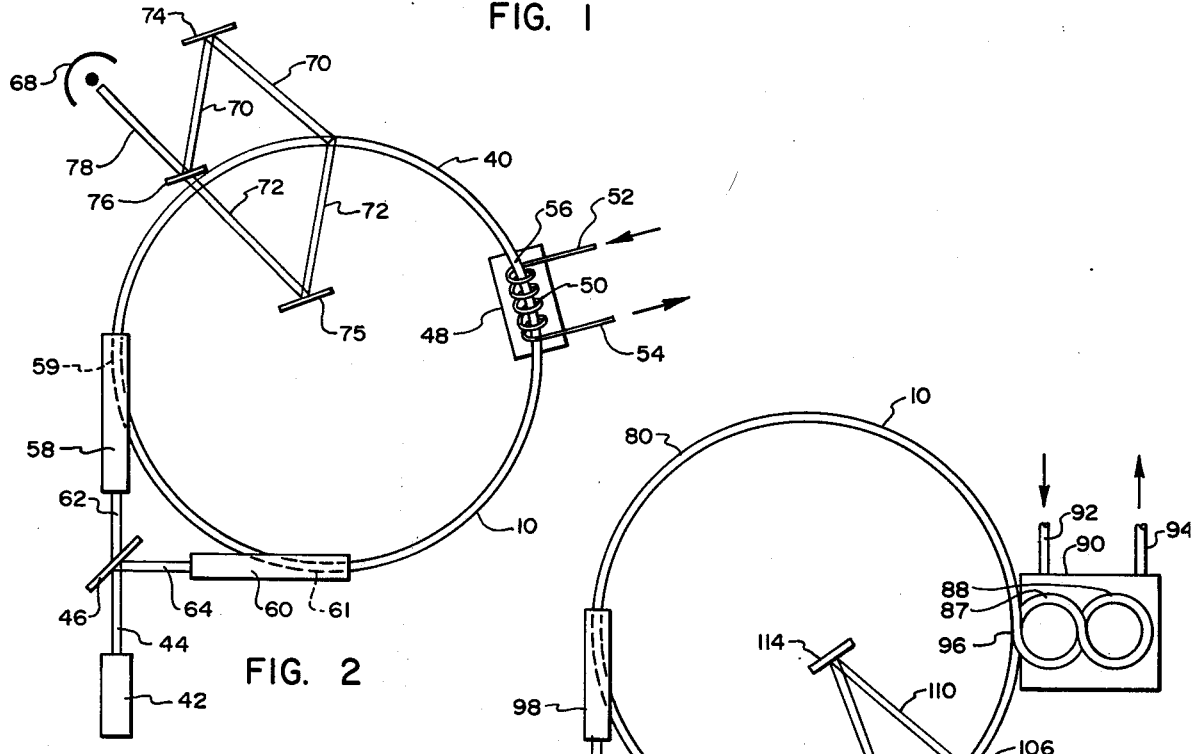
FIG. 2 is an illustration of a first presently preferred embodiment of the apparatus of this invention.

Referring now more particularly to FIG. 2, a first preferred embodiment of the invention is illustrated in the form of a single loop 40 of single-mode optical fiber waveguide 10.

Pumping laser radiation 44 from a pumping laser 42 is split by a beam splitter 46 into pumping laser beams 62 and 64 which are then directed into the loop 40 by optical coupling devices 58 and 60, respectively, the function of which will be discussed more fully hereinafter. The two counterdirectionally-travelling pumping laser beams 62 and 64 induce SBS radiation as set forth in FIG. 1 with respect to the description of pumping radiation 18 and 20, respectively.

The SBS radiation induced by each of pumping laser beam 62 and 64 travels oppositely of the direction of travel of each of pumping laser beam 62 and 64, respectively. A portion of each SBS radiation is extracted from ring 40 by an imperfect splice 66 which suitably deflects SBS radiation beams 70 and 72 therefrom toward mirrors 74 and 75, respectively. SBS radiation beams 70 and 72 are reflected by mirrors 74 and 75, respectively, to a beam splitter 76 which combines SBS radiation beams 70 and 72 into a combined SBS radiation beam 78. A conventional detector 68 is placed in the path of combined SBS radiation beam 78 and is used to detect a beat frequency between SBS radiation beams 70 and 72. The beat frequency developed is proportional to the rate of angular rotation of the plane of the area circumscribed by the ring 40 as set forth hereinbefore with respect to Equation (1).

Advantageously, a section 56 of the ring 40 is adapted to be cooled in a cryogenic container 48 through which a suitable coolant such as liquid nitrogen, liquid helium or the like is passed. The coolant flows through cryogenic container 48 from an inlet 52 to an outlet 54 through a plurality of coils 50 surrounding section 56. Although illustrated herein as a plurality of coils 50, clearly, any suitable cryogenic container 48 may be advantageously used to cool section 56.

As set forth hereinbefore, cooling of a section 56 of the single-mode optical fiber waveguide 10 of ring 40 substantially decreases the required pumping radiation 44 from pumping laser 42 by significantly reducing the decay of the respective acoustic waves. To this end, the cooled section 56 acts as a gain medium for the SBS radiation. Clearly, section 56 could encompass the entire ring 40. However, due to increased cost factors and difficulty with optical coupling, it is currently believed that it is preferable to cool only a small segment 56 of ring 40.

Optical couplers 58 and 60 are formed as sheaths which enclose respective portions of ring 40. The enclosed portions are shown in broken lines as segments 59 and 61, respectively. Each of optical couplers 58 and 60 are conventional devices and contain a fluid having an index of refraction which closely approximates the index of refraction of cladding 14 of single-mode optical fiber waveguide 10. These fluids are generally hydrocarbons and are known in the art as index-matching fluids. In this manner, pumping laser beams 62 and 64 and introduced into optical couplers 58 and 60, respectively, where they readily pass into the optical fiber ring 40 to induce SBS laser radiation in the core thereof as set forth hereinbefore with respect to FIG. 1.

Figure 3:
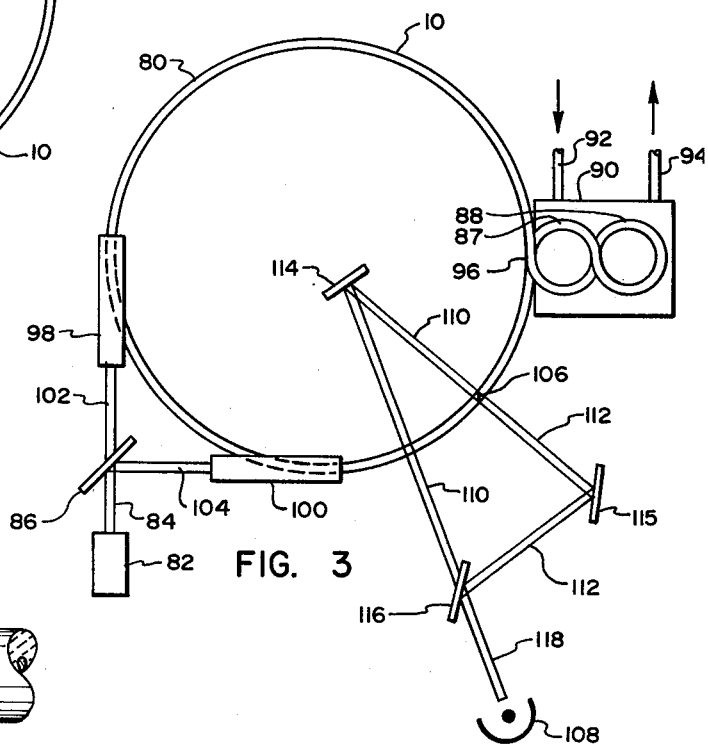
FIG. 3 is an illustration of a second presently preferred embodiment of the apparatus of this invention.

Referring now more particularly to FIG. 3, a second preferred embodiment of the invention is shown herein as a SBS ring laser formed as a primary loop 80 and a secondary loop 96. Secondary loop 96 includes double tertiary loops 87 and 88 of the single-mode optical fiber waveguide 10. Secondary loop 96, including tertiary loops 87 and 88, is immersed in a cryogenic container 90 to, preferentially, maintain the temperature of at least a portion of secondary loop 96 at a low temperature. Cryogenic container 90 is configurated as a closed vessel having an input 92 and an outlet 94 for a suitable cryogenic liquid such as liquid nitrogen, liquid helium, or the like, which will suitably cool the secondary loop 96.

Tertiary loops 87 and 88 each counterdirectionally circumscribe substantially equal areas to assure cancellation of any adverse effects created by the rotation of the combined secondary loop 96 and also cancel out any adverse length changes of the single-mode optical fiber waveguide 10 created by cooling of secondary loop 96.

Pumping laser radiation 84 is produced by a pumping laser 82 and directed to a beam splitter 86 where it is divided into pumping laser beams 102 and 104. Pumping laser beams 102 and 104 are introduced into ring laser 80 by optical couplers 98 and 100, respectively. Optical couplers 98 and 100 are fabricated similar to optical couplers 58 and 60 (FIG. 2) and, therefore, also function similarly for introducing pumping laser beams 102 and 104 into the single-mode optical fiber waveguide 10 of primary loop 80. Pumping laser beams 102 and 104 each pump at least a portion of single-mode optical fiber waveguide 10 to induce SBS radiation therein. Preferentially, this pumping action occurs in the cooled section of secondary loop 96 so as to thereby reduce the required pumping power necessary to induce SBS radiation. Clearly, any portion of either pumping loop 80 or secondary loop 96 could be suitably pumped with pumping laser beams 102 and 104 to induce the SBS radiation.

The induced SBS radiation traverses primary loop 80 and secondary loop 96 counter-directionally to the respective pumping laser beams 102 and 104. A portion of each of the SBS radiation thus induced is deflected from the single-mode optical fiber waveguide 10 by an imperfect splice 106 which functions similarly to imperfect splice 66 (FIG. 2). Clearly, other conventional techniques for diverting a portion of the SBS radiation from the single-mode optical fiber waveguide 10 could also be used in place of imperfect splices 106 and 66 (FIG. 2). However, for ease of presentation, the discussion will be limited to imperfect splice 106 and its function.

Imperfect splice 106 deflects a portion of the SBS radiation travelling in each direction through primary loop 80 and secondary loop 96 as SBS beams 110 and 112. SBS beams 110 and 112 are reflected by mirrors 114 and 115, respectively, to a beam splitter 116 which combines SBS beams 110 and 112 into a combined SBS beam 118. A conventional detector 108 is placed where it can intercept combined SBS beam 118 and thereby detect a beat frequency therein as a function of the rate of angular rotation of the plane of primary loop 80.

The pumping laser and detector apparatus of the second embodiment of FIG. 3 are substantially similar to the pumping laser and detector apparatus of the first preferred embodiment illustrated in FIG. 2. The principal difference in the two embodiments resides in the cooled section.

Figure 4:
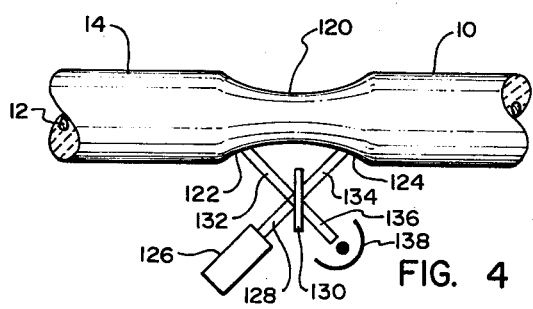
FIG. 4 is an enlarged schematic illustration of an alternate technique for providing laser communication with the core of a single-mode optical fiber waveguide.

Referring now more particularly to FIG. 4, a second preferred embodiment for optically coupling a pumping laser with the single-mode optical fiber waveguide is illustrated. In particular, a single-mode optical fiber waveguide 10 is drawn during manufacture to create a sharp change in the cross-sectional area of the cladding 14 only. This constriction in cladding 14 is indicated herein as constriction 120. Constriction 120 forms a sharp curvature in the contour of cladding 14 and is indicated herein as sloped surfaces 122 and 124 which are used as a means for introducing pumping radiation and also removing the SBS radiation from the single-mode optical fiber waveguide as will be discussed more fully hereinafter.

Pumping laser radiation 128 is emitted by a pumping laser 126 and is split by a beam splitter 130 into pumping laser beams 132 and 134 which strike sloped surfaces 122 and 124, respectively. Pumping laser beams 132 and 134 are then directed into core 12 of the single-mode optical fiber waveguide 10 where they operate to induce SBS laser radiation as set forth with respect to FIG. 1. A portion of the SBS laser radiation in each direction is removed from single-mode optical fiber waveguide 10 at each of surfaces 122 and 124 where they are combined by beam splitter 130 and directed as a combined beam 136 to a detector 138. The combined beam 136 develops a beat frequency as a result of the angular rotation of the area circumscribed by the single-mode optical fiber waveguide 10 thereby providing an indication of the rate of angular rotation thereof.

Advantageously, the SBS ring laser gyroscope as set forth herein completely eliminates the problem of unidirectional oscillation encountered frequently in solid state ring laser devices and also eliminates the many error-inducing factors encountered with a gaseous gain medium.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A stimulated Brillouin scattering ring laser gyroscope comprising:
   a loop of single-mode optical fiber waveguide;
   a laser means optically coupled with the single-mode optical fiber waveguide;
   means for pumping single-mode optical fiber waveguide in a first and a second direction with the laser means to induce stimulated Brillouin scattering radiation counter-directionally in the single-mode optical fiber waveguide; and
   means for extracting a portion of each of the stimulated Brillouin scattering radiation from the single-mode optical fiber waveguide.

2. The stimulated Brillouin scattering ring laser gyroscope defined in claim 1 wherein at least a segment of the single-mode optical fiber waveguide is cooled.

3. The stimulated Brillouin scattering ring laser gyroscope defined in claim 2 wherein the segment is formed as a secondary loop.

4. The stimulated Brillouin scattering ring laser gyroscope defined in claim 3 wherein the secondary loop is formed as a figure eight.

5. An induced Brillouin scattering ring laser gyroscope comprising:
   a single-mode optical fiber waveguide formed into a loop;
   means for introducing laser radiation counter-directionally into the single-mode optical fiber waveguide at a sufficient power level to induce stimulated Brillouin scattering radiation in each direction in the optical fiber waveguide;
   means for directing a portion of the stimulated Brillouin scattering radiation from the optical fiber waveguide to a means for combining the two portions of stimulated Brillouin scattering radiation; and
   means for detecting frequency differences between the combined portions of stimulated Brillouin scattering radiation as a function of the rotation of the loop.

6. The gyroscope defined in claim 5 wherein the means for introducing laser radiation into the single-mode optical fiber waveguide comprises a single source of laser radiation and beam splitter means for directing a portion of the laser radiation counter-directionally into the single-mode optical fiber waveguide.

7. A method for determining angular rotation of an area comprising the steps of:
   circumscribing the area with a single-mode optical fiber waveguide;
   pumping the single-mode optical fiber waveguide in a first direction with a first laser beam having sufficient energy to induce a first stimulated Brillouin scattering radiation in the single-mode optical fiber waveguide, the first stimulated Brillouin scattering radiation traversing the single-mode optical fiber waveguide counter-directionally to the first laser beam while simultaneously pumping the single-mode optical fiber waveguide in a second direction with a second laser beam having sufficient energy to induce a second stimulated Brillouin scattering radiation in the single-mode optical fiber waveguide, the second stimulated Brillouin scattering radiation traversing the single-mode optical fiber waveguide counter-directionally to the second laser beam, the second direction being reverse of the first direction;
   extracting a portion of each of the first and the second stimulated Brillouin scattering radiation from the single-mode optical fiber waveguide;
   superimposing the first and the second portions of stimulated Brillouin scattering radiation;
   detecting a beat frequency developed in the superimposed first and second stimulated Brillouin scattering radiation; and
   measuring the detected beat frequency as a function of the angular rotation of the area circumscribed by the single-mode optical fiber waveguide.

8. The method defined in claim 7 wherein the circumscribing step further comprises cooling a segment of the single-mode optical fiber waveguide to thereby significantly lower the required pumping energy of the first and second laser beams.

9. The method defined in claim 7 wherein the circumscribing step further comprises forming a secondary loop in the single-mode optical fiber waveguide in the configuration of a figure eight and cooling the secondary loop compensating for changes in length of the single-mode optical fiber waveguide caused by the cooling.

10. The method defined in claim 7 wherein the pumping steps comprise splitting a laser beam from a pump laser into the first laser beam and the second laser beam.

11. A stimulated Brillouin scattering ring laser gyroscope comprising:
a single-mode optical fiber waveguide, the single-mode optical fiber waveguide formed into a primary loop and at least one secondary loop;
means for cooling at least a portion of the secondary loop to low temperatures;
means for pumping the single-mode optical fiber waveguide in each direction with laser radiation having sufficient energy to induce stimulated Brillouin scattering radiation in at least the cooled portion of the secondary loop so as to emit stimulated Brillouin scattering radiation counter-directionally through the primary loop;
means for removing a portion of each of the stimulated Brillouin scattering radiation from the single-mode optical fiber waveguide;
means for combining the removed portions of stimulated Brillouin scattering radiation; and
means for detecting a beat frequency between the combined portions of stimulated Brillouin scattering radiation as a function of the rate of angular rotation of the primary loop of single-mode optical fiber waveguide.

12. A method for decreasing pumping power levels of pumping laser radiation required to induce stimulated Brillouin scattering radiation in a stimulated Brillouin scattering ring laser gyroscope comprising the steps of:
forming a length of single-mode optical fiber waveguide into a primary loop and at least one coextensive secondary loop;
decreasing the pumping power level of pumping laser radiation required to induce stimulated Brillouin scattering radiation in the single-mode optical fiber waveguide by cooling at least a portion of the secondary loop of single-mode optical fiber waveguide to a low temperature;
pumping the single-mode optical fiber waveguide in each direction at a power level below the power level required to induce stimulated Brillouin scattering radiation in the single-mode optical fiber waveguide which is not subjected to cooling and at a power level sufficient to induce stimulated Brillouin scattering only in the portion of single-mode optical fiber waveguide cooled to the low temperature.

* * * * *